Figure 3:
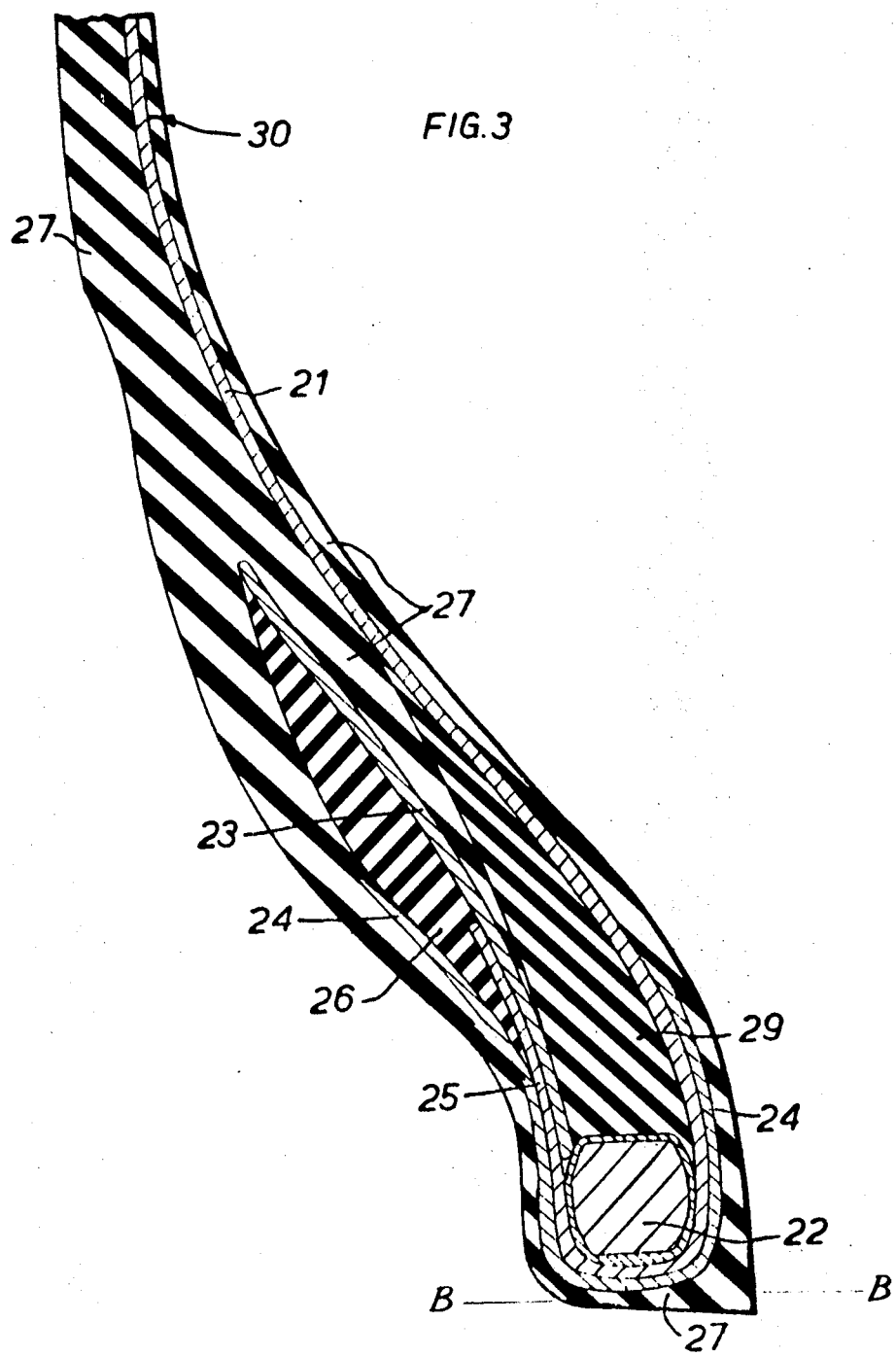

United States Patent

[11] 3,612,138

| [72] | Inventor | Arthur S. Ravenhall<br>Solihull, England |
|---|---|---|
| [21] | Appl. No. | 839,863 |
| [22] | Filed | July 8, 1969 |
| [45] | Patented | Oct. 12, 1971 |
| [73] | Assignee | Dunlop Holdings Limited<br>London, England |
| [32] | Priority | July 23, 1968 |
| [33] | | Great Britain |
| [31] | | 35078/68 |

[54] TIRE BEAD TURNUP EXTENSION
14 Claims, 3 Drawing Figs.

[52] U.S. Cl. .................................................. 152/362 R,
 152/354
[51] Int. Cl. .................................................. B60c 15/06
[50] Field of Search .......................................... 152/362,
 354, 356

[56] References Cited
UNITED STATES PATENTS

| 2,947,342 | 8/1960 | Holloway ................... | 152/362 CS |
| 3,013,599 | 12/1961 | Riggs .......................... | 152/362 |
| 3,172,445 | 3/1965 | Boussu et al. ................ | 152/354 |
| 3,205,931 | 12/1965 | Keefe, Jr. .................... | 152/354 |

Primary Examiner—Arthur L. La Point
Assistant Examiner—George H. Libman
Attorney—Stevens, Davis, Miller & MOsher ABSTRACT: A tire with a carcass having a ply or plies turned up around a bead wire. A reinforcing strip of rubberized cord fabric is provided overlapping the turnup and forming a radially outward extension of the turnup. The cords in the reinforcing strip are disposed at the same angle as the cords in the carcass ply but are more flexible. The invention is particularly applicable to radial ply tires having metal cord reinforcements.

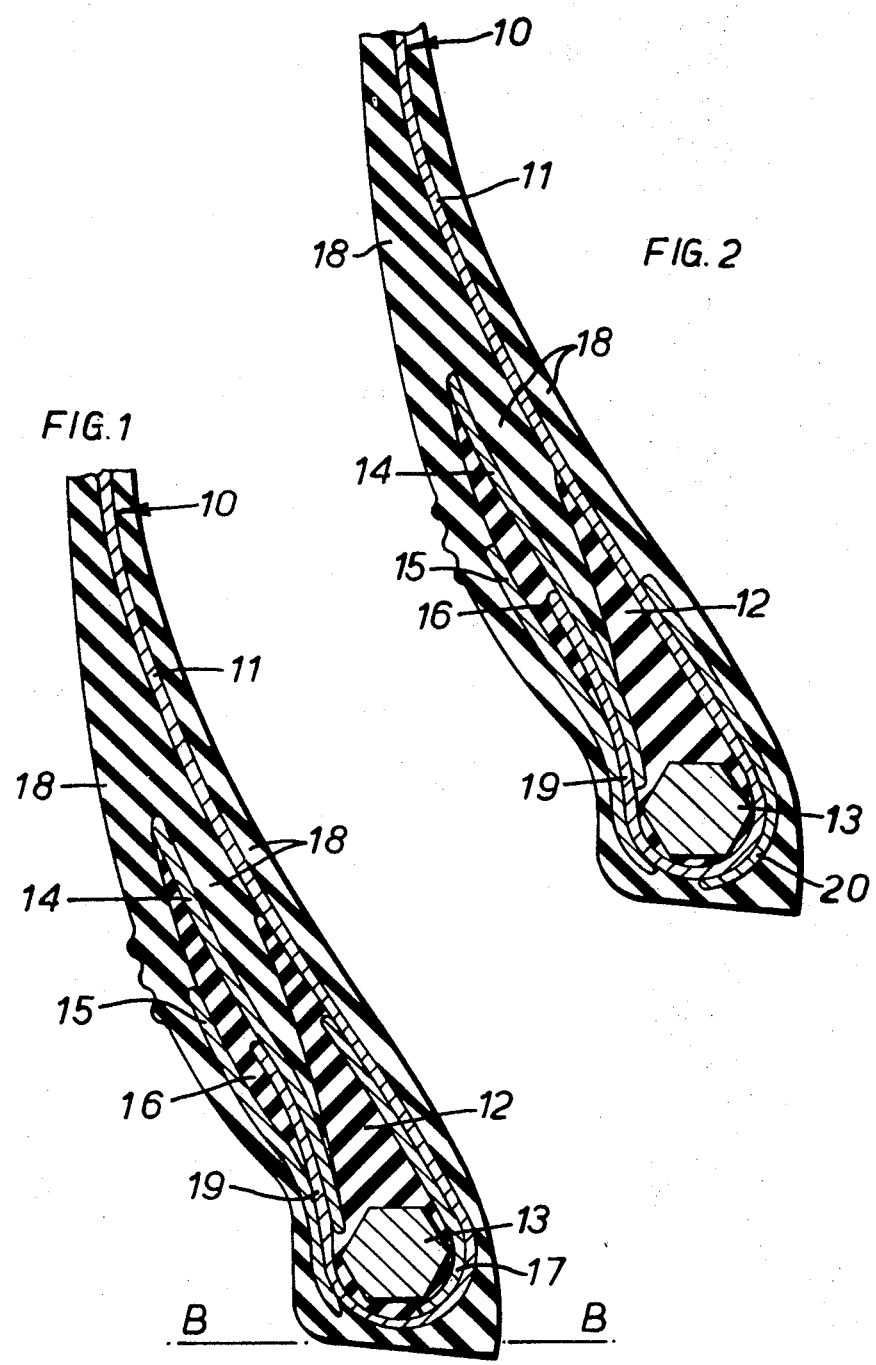

TIRE BEAD TURNUP EXTENSION

This invention relates to pneumatic tires.

It is known that the part of a tire between the sidewall region, which must of necessity be fairly flexible, and the bead region, which must be comparatively rigid, is generally weak on account of the considerable change in properties, especially the stiffness of the material of the two regions, in a short distance. In addition, the ply turnup usually ends in this part and if not properly supported, especially if the ply comprises metal cords, internal rupture of the tire may occur at the turnup extremity.

It is an object of the present invention to provide a tire construction in which the aforementioned disadvantages are reduced or obviated.

ACcording to the invention a pneumatic tire comprises a carcass including at least one ply of cords turned up around a bead wire and a reinforcing strip of rubberized cord fabric forming a radially outward extension of the turnup, said strip overlapping the turnup, being comprised of cords disposed at substantially the same angle as that of the carcass cords and being of greater flexiblity than the carcass ply.

THe reference above to the flexibility of the strip and the flexibility of the carcass ply refers to the resistance exerted by these components of the tire to normal flexing of the tire when in use. Thus the flexibility of the strip and that of the ply are dependent upon the stiffness of the materials from which the strip and the ply are made.

The cords in the strip and the ply may be formed of textile filament but are preferably formed of metal wires, e.g. steel wires. The greater flexibility of the strip compared to the ply may be by virtue of the elastic properties of the cord material or the rubber in which the cords are embedded, the diameter, number of configuration of the filaments or wires in the cords or the spacing of the cords in the strip. The cords of the strip and of the ply may extend radially of the tire, i.e. at substantially 90° to a tire circumference, or at an angle of less than 90° to a circumference, e.g. in crossply configuration.

When the cords of the strip and the ply are in cross ply configuration the cords of the strip have substantially the same bias angle as that of the adjacent ply. The bias of the cords of the strip can be in the same direction as the bias of the ply or, if desired, in the opposite direction.

For example in a preferred construction of a giant tire according to the invention the cords of the ply and of the strip extend radially of the tire and all comprise steel wires, the wires of the strip cords being of smaller diameter and having a lower breaking strength than the wires of the ply cords.

Preferably the reinforcing strip and the ply turnup are adhered directly together in the whole of the area of their overlap, i.e. in the area of overlap the reinforcing strip and the ply turnup are separated only by a thin layer of adhesive rubber compound.

A reinforced chafer strip at least partially embracing the bead wire can be provided in the tire and in this case the radially outer edge of the reinforcing strip on the axially outer side of the bead wire is located radially outwardly of the radially outer edge of the chafer strip.

A bead toe filler may also be provided, the filler comprising, e.g. rubberized cord fabric, located generally axially inwardly of the tire bead and extending from the bead base a relatively short distance radially outwardly into the sidewall. This filler may be located internally, i.e. between the carcass ply and the bead wire or externally, i.e. the carcass ply lies between the bead wire and the filler.

Various embodiments of the invention will now be described, by way of example only, with reference to the accompanying drawings in which FIG. 1 is a cross section of the lower sidewall and bead regions of a tire in accordance with the invention;

FIG. 2 is a view similar to FIG. 1 showing a tire in which the bead toe filler strip is positioned externally of the ply; and, FIG. 3 is a view similar to FIG. 1 showing a tire in which the chafer strip is folded around the bead wire.

Referring to FIG. 1, a 12.00–20 truck tire comprises a carcass 10 including a ply 11 of steel cords, a bead wire 13, a rubber apex 12, a ply extension reinforcing strip 14, a chafer strip 15 and a bead toe filler 17 all embedded in vulcanized rubber 18. The steel cords of the ply 11 are disposed substantially radially within the tire and each cord is formed of 28 individual wires having a diameter of 0.0086 inch. The wires in each cord are arranged in six strands around a core of four wires each of the strands having four wires, and each cord is wrapped with a single wire of 0.0059 inch diameter. The cord spacing in the ply 21 is 11 ends inch.

The ply 11 is turned axially outwardly around each bead wire 13 and apex 12 and forms a turnup 19 the radially outer extremity of which ends 2 inches radially outwardly of the bead base (line B.B in the drawing). The ply extension reinforcing strip 14 is of rubberized steel cord fabric and extends circumferentially round the tire between two concentric circles three-fourths inch and 3⅝ inches respectively radially outwards of the bead base. The radially inner portion of the reinforcing strip 14 is located axially inwardly of and in direct overlapping relationship with the turnup 19 so that the reinforcing strip 14 forms a radially outward extension of the turnup 19. The cords in the reinforcing strip 14 are radially extending and, while the cores of the ply 11 are made up of 28 steel wires of 0.0086 inch diameter, those of ply extension 14 are made up of 38 steel wires of 0.0059 inch diameter. Each cord is built up of five strands of seven wires per strand, around a core of three wires and is wrapped with a single wire of 0.0059 inch diameter. The cord spacing in the reinforcing strip 14 is 12 ends/inch and the reinforcing strip 14 is more flexible than the ply 11.

The chafer strip 15 of rubberized steel cord fabric extends from the bead base 2⅝inches radially outwardly therefrom with its radially outer edge being between the radially outer edges of the turnup 19 and the reinforcing strip 14 respectively. The rubberized steel cord fabric of the chafer strip 15 is the same as that of the reinforcing strip 14. A rubber filler strip 16 is located between the radially outer part of the turnup 19 and the chafer strip 15 to prevent internal chafing and to reduce likelihood of failure at this region of the tire.

The bead toe filler 17 comprises a strip of rubberized steel cord fabric and is located generally axially inwardly of the bead wire 13 and extends from the bead base a relatively short distance radially outwardly into the tire sidewall. The bead toe filler 17 is in an internal position, i.e. it is located between the bead wire 13 and the ply 11, and is made of the same steel cord fabric as the chafer strip 15.

In the above construction the cords of the reinforcing strip 14 can alternatively be formed from 30 steel wires of 0.0069 inch diameter, each cord being built up of three strands of 10 wires per strand. Also the fabric of the chafer strip 15 and the bead toe filler 17 can alternatively be made from cords containing 39 steel wires of 0.0059 inch diameter. Each such cord is built up of nine strands of three wires per strand around nine individual wires around a core of three wires and is wrapped with a single wire of 0.0059 inch diameter.

FIG. 2 shows a modification of the 12.00–20 tire shown in FIG. 1. As shown in FIG. 2 a truck tire has a carcass 10 including a ply 11 an apex 12, a bead wire 13, a ply extension reinforcing strip 14, a chafer strip 15, a rubber filler strip 16 and a turnup 19 similar to those shown in FIG. 1. In the modified tire of FIG. 2, however, a bead toe filler 20 is provided in an external position, i.e. the ply 11 is located between the filler 20 and the bead wire 13.

Referring now to FIG. 3 an 18.00–25 earthmover tire comprises a carcass 30 including a ply 21 of steel cords, a bead wire 22, a rubber apex 29, a ply extension reinforcing strip 23, and a chafer strip 24 all embedded in vulcanized rubber 27. The cords of the ply 21 extend substantially radially of the tire and are made up of 38 individual wires having a diameter of 0.011 inch, the cord spacing in this case being 8 cords/inch. Each cord is built up of five strands of seven wires per strand around a core of three wires and is wrapped with a single wire of 0.0059 inch diameter.

The ply 21 is turned axially outwardly round each bead wire 22 and apex 29 and forms a turnup 25, the radially outer extremity of which ends 2 inches radially outwardly of the bead base B—B. The reinforcing strip 23 extends circumferentially round the tire between two concentric circles 1 inch and 5½ inches respectively radially outwardly of the bead base and is of rubberized steel cord fabric. The radially inner portion of the strip 23 is located axially inwardly of, and in direct overlapping relationship with, the turnup 25 so that the reinforcing strip 23 forms a radially outward extension of the turnup 25.

The cords of the reinforcing strip 23 extend radially with respect to the tire and are made up of 21 steel wires of diameter 0.0086 inch, the cord spacing being 13 ends/inch. Each cord is built up of three strands of seven wires per strand and has a high extensibility construction in which the twist in the individual strands is in the same direction as the twist in the cord.

The chafer strip 24 is of rubberized steel cord fabric, and embraces the bead wire 22, extending radially outwardly of the bead base both axially outwardly and axially inwardly thereof. The carcass ply 21 lies between the bead wire 22 and the chafer strip 24. Axially inwardly of the bead wire 22 the edge of the chafer strip 24 lies 2½ inches radially outwardly of the bead base while axially outwardly of the bead wire 22 the edge of the chafer strip 24 lies 3⅜ inches radially outwardly of the bead base between the radially outer edges of the reinforcing strip 23 and the turnup 25 respectively. The cords of the chafer strip 24 are formed from 39 wires of 0.0059 inch diameter, each cord being built up of nine strands of three wires per strand around nine individual wires around a core of three wires and being wrapped with a single wire of 0.0059 inch diameter. The cord spacing in the fabric of the chafer strip is 12 ends/inch.

A rubber filler strip 26 is located between the radially outer part of the turn up 25 and the chafer strip 24 to prevent internal chafing and reduce the likelihood of failure at this region of the tire.

In the construction of FIG. 3 described above the cords of the ply 21 can alternatively be formed from 28 steel wires of 0.0086 inch diameter, each cord being built up of six strands of four wires per strand around a core of four wires, and being wrapped with a single wire of 0.0059 inch diameter. The cord spacing in this case is 11 ends/inch.

Although in the tires illustrated in FIGS. 1, 2 and 3 of the drawings and described above the ply extension reenforcing strip is located axially inwardly of the turnup, the strip may alternatively be located axially outwardly of the turnup and in both instances it forms an anchorage for the turn up owing to the adhesion between the rubber of the reinforcing strip and of the ply.

When the reinforcing strip is located axially outwardly of the turnup the rubber filler strip will be located between the chaffer strip and the reinforcing strip.

In use, the tires of the invention have several advantages over tires of hitherto known constructions. The use of a ply extension reinforcing strip which is relatively more flexible than the carcass ply enables better adhesion to be maintained between the various components of the bead region when the tire is caused to flex and also gives a more gradual change of the stiffness of the tire radially outwardly of the bead than if the ply extended further radially outwardly. This more gradual change in stiffness and other properties is also obtained by arranging that the radially outer edge of the chafer strip lies between the radially outer edges of the turnup and extension strip respectively rather than immediately adjacent either.

The rubber filler strip provided adjacent the chafer strip prevents chafing of the various layers of cord fabric and provides an effective anchorage of the edge of the chafer strip which is embedded in it. It also increases the flexibility of that region of the tire.

THe performance of the tire is also improved by the location of the bead toe filler internally rather than externally. In this preferred location it tends to reduce circumferential ply movement in the radially outer part of the bead region and thus reduces movement of the ply extension strip which could lead to internal failure.

Having now described my invention What I claim is:

1. A radial ply pneumatic tire comprising a carcass including a least one ply of radial cords turned up around a bead wire and a reinforcing strip of rubberized cord fabric forming a radially outward extension of the turnup, said strip overlapping the turnup, being comprised of cords disposed in the radial direction, being of greater flexibility than the carcass ply and being adhered directly to the carcass ply turnup over substantially the whole of their area of overlap.

2. A tire according to claim 1 in which the cords of the ply and the reinforcing strip comprise metal wires.

3. A tire according to claim 2 in which the metal wires are steel wires.

4. The tire of claim 1 in which the diameter of the cords of the strip is less than that of the wires in the cords of the carcass ply.

5. The tire of claim 1 in which the number of filaments in the cords of the strip is less than that of the wires in the cords of the carcass ply.

6. A tire according to claim 1 in which the spacing of the cords in the strip is wider than that of the cords in the carcass ply.

7. A tire according to claim 1 in which the reinforcing strip is located axially inwardly of the turnup.

8. A tire according to claim 1 which includes a chafer strip which at least partially embraces the bead wire, the radially outer edge of the reinforcing strip on the axially outer side of the bead wire being located radially outwardly of the radially outer edge of the chafer strip.

9. A tire according to claim 8 in which the radially outer edge of the chafer strip on the axially outer side of the bead wire is located radially outwardly of the radially outer edge of the turnup.

10. A tire according to claim 8 in which the reinforcing strip is located axially inwardly of the turnup and a rubber filler strip is located between at least the radially outer part of the turnup and the chafer strip.

11. A tire according to claim 8 in which the reinforcing strip is located axially outwardly of the turnup and a rubber filler strip is located between the chafer strip and the reinforcing strip.

12. A tire according to claim 8 in which the chafer strip is of rubberized steel cord fabric.

13. A tire according to claim 1 which includes a bead toe filler located generally axially inwardly of the bead wire.

14. A tire according to claim 13 in which the bead toe filler is located in an internal position relative to the ply.